(12) United States Patent
Qin et al.

(10) Patent No.: US 11,768,876 B2
(45) Date of Patent: Sep. 26, 2023

(54) METHOD AND DEVICE FOR VISUAL QUESTION ANSWERING, COMPUTER APPARATUS AND MEDIUM

(71) Applicant: Beijing Baidu Netcom Science Technology Co., Ltd., Beijing (CN)

(72) Inventors: Xiameng Qin, Beijing (CN); Yulin Li, Beijing (CN); Qunyi Xie, Beijing (CN); Ju Huang, Beijing (CN); Junyu Han, Beijing (CN)

(73) Assignee: Beijing Baidu Netcom Science Technology Co., Ltd., Beijing (CN)

(*) Notice: Subject to any disclaimer, the term of this patent is extended or adjusted under 35 U.S.C. 154(b) by 346 days.

(21) Appl. No.: 17/161,466

(22) Filed: Jan. 28, 2021

(65) Prior Publication Data

US 2021/0406468 A1 Dec. 30, 2021

(30) Foreign Application Priority Data

Jun. 30, 2020 (CN) .......................... 202010616632.6

(51) Int. Cl.
*G06F 16/9032* (2019.01)
*G06F 16/583* (2019.01)
(Continued)

(52) U.S. Cl.
CPC ...... *G06F 16/90332* (2019.01); *G06F 16/532* (2019.01); *G06F 16/583* (2019.01);
(Continued)

(58) Field of Classification Search
CPC ............. G06F 16/90332; G06F 16/532; G06F 16/583; G06F 18/213; G06F 18/253;
(Continued)

(56) References Cited

U.S. PATENT DOCUMENTS

2017/0124432 A1 5/2017 Chen et al.
2020/0285944 A1* 9/2020 Lee ...................... G06V 10/426

FOREIGN PATENT DOCUMENTS

EP 3166049 A1 5/2017
JP 2017-091525 5/2017

OTHER PUBLICATIONS

Leveraging Scene Graph for VQA, Zhang et al, 2019; https://arxiv.org/pdf/1907.12133.pdf (Year: 2019).*

(Continued)

*Primary Examiner* — Jianxun Yang
(74) *Attorney, Agent, or Firm* — Hamre, Schumann, Mueller & Larson, P.C.

(57) ABSTRACT

The present disclosure provides a method for visual question answering, which relates to a field of computer vision and natural language processing. The method includes: acquiring an input image and an input question; constructing a Visual Graph based on the input image, wherein the Visual Graph comprises a Node Feature and an Edge Feature; updating the Node Feature by using the Node Feature and the Edge Feature to obtain an updated Visual Graph; determining a question feature based on the input question; fusing the updated Visual Graph and the question feature to obtain a fused feature; and generating a predicted answer for the input image and the input question based on the fused feature. The present disclosure further provides an apparatus for visual question answering, a computer device and a non-transitory computer-readable storage medium.

12 Claims, 7 Drawing Sheets

Figure 1:
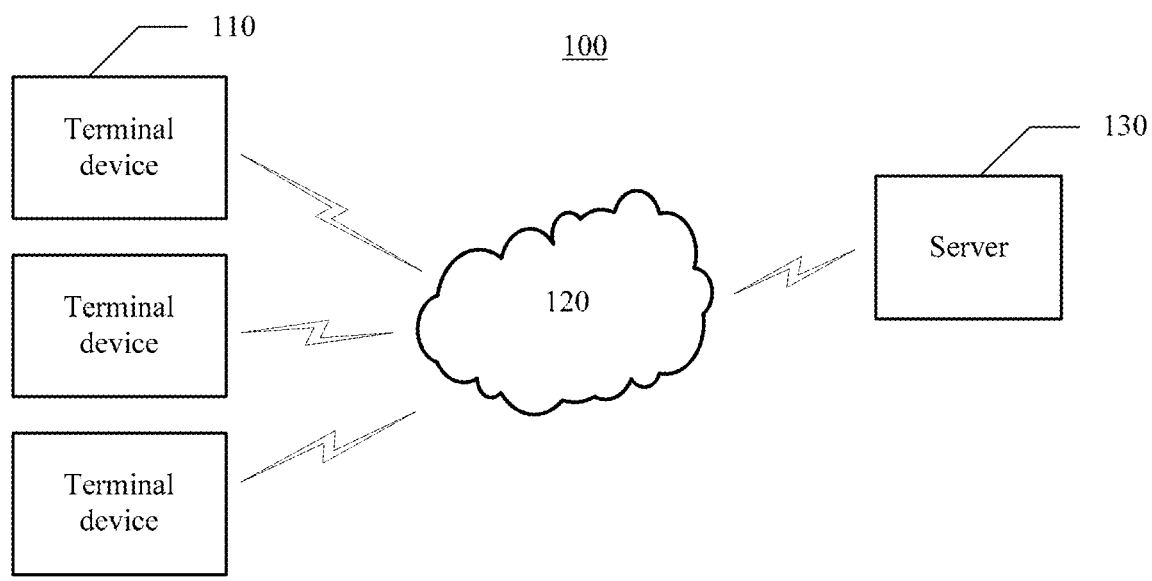

(51) Int. Cl.
| | |
|---|---|
| *G06F 16/532* | (2019.01) |
| *G06F 40/279* | (2020.01) |
| *G06N 3/04* | (2023.01) |
| *G06N 3/088* | (2023.01) |
| *G06F 18/213* | (2023.01) |
| *G06F 18/25* | (2023.01) |
| *G06V 10/25* | (2022.01) |
| *G06V 10/764* | (2022.01) |
| *G06V 10/80* | (2022.01) |
| *G06V 10/82* | (2022.01) |
| *G06V 10/44* | (2022.01) |

(52) U.S. Cl.
CPC .......... *G06F 18/213* (2023.01); *G06F 18/253* (2023.01); *G06F 40/279* (2020.01); *G06N 3/04* (2013.01); *G06N 3/088* (2013.01); *G06V 10/25* (2022.01); *G06V 10/454* (2022.01); *G06V 10/764* (2022.01); *G06V 10/806* (2022.01); *G06V 10/82* (2022.01); *G06V 2201/07* (2022.01)

(58) Field of Classification Search
CPC ........ G06F 40/279; G06F 16/58; G06F 40/30; G06F 18/22; G06N 3/04; G06N 3/088; G06N 3/044; G06N 3/045; G06N 5/022; G06N 3/08; G06N 5/045; G06V 10/25; G06V 10/454; G06V 10/764; G06V 10/806; G06V 10/82; G06V 2201/07; G06V 10/40; G06V 20/00
See application file for complete search history.

(56) References Cited

OTHER PUBLICATIONS

Japanese Notice of Reasons for Refusal, dated May 9, 2022, 12 pages, cited in corresponding Japanese Patent Application No. 2021-035343.

Teney et al., "Graph-Structured Representations for Visual Question Answering", The University of Adelaide, dated Mar. 30, 2017, 17 pages.

Li et al., "Relation-Aware Graph Attention Network for Visual Question Answering", Microsoft Dynamics 365 AI Research, dated Oct. 9, 2019, 10 pages.

Ren et al., "Finding Images by Dialoguing with Image", Oct. 15, 2019, 10 pages, cited in European Search Report issued in corresponding European Patent Application No. 21165274.8.

Wang et al., "Cross-modal Scene Graph Matching for Relationship]aware Image-Text Retrieval", Oct. 11, 2019, 10 pages, cited in European Search Report issued in corresponding European Patent Application No. 21165274.8.

European Search Report issued in corresponding European Patent Application No. 21165274.8, dated Sep. 21, 2021, 10 pages.

* cited by examiner

METHOD AND DEVICE FOR VISUAL QUESTION ANSWERING, COMPUTER APPARATUS AND MEDIUM

CROSS-REFERENCE TO RELATED APPLICATION(S)

This application claims priority to the Chinese Patent Application No. 202010616632.6, filed on Jun. 30, 2020, which is incorporated herein by reference in its entirety.

TECHNICAL FIELD

The present disclosure relates to a field of computer vision and natural language processing, and more specifically, to a method and an apparatus for visual question answering, a computer device and a medium.

BACKGROUND

Visual question answering (VQA) is a challenging task, and a goal of visual question answering is to associate computer vision with natural language processing. In a visual question answering task, for example, given an image and a question related to the image, a machine is required to infer an answer for the question according to image content and some common sense. In order to complete the visual question answering task, the machine is ensured to have an ability of cross-modal understanding, to realize a comprehensive understanding of data under two different modalities of vision and language. Therefore, the visual question answering task has more requirements compared with other single modality tasks (such as image identification, document classification, etc.).

SUMMARY

In view of this, the present disclosure provides a method and an apparatus for visual question answering, a computer device and a medium.

One aspect of the present disclosure provides a method for visual question answering, comprising: acquiring an input image and an input question; constructing a Visual Graph based on the input image, wherein the Visual Graph comprises a Node Feature and an Edge Feature; updating the Node Feature by using the Node Feature and the Edge Feature to obtain an updated Visual Graph; determining a question feature based on the input question; fusing the updated Visual Graph and the question feature to obtain a fused feature; and generating a predicted answer for the input image and the input question based on the fused feature.

According to an embodiment of the present disclosure, the constructing the Visual Graph based on the input image comprises: processing the input image by using an Object Detection Network to extract an appearance feature and a spatial feature of a plurality of target objects in the input image from a middle layer of the Object Detection Network; determining the Node Feature based on the appearance feature and the spatial feature; determining position information of each of the plurality of target objects based on a processing result output by an output layer of the Object Detection Network; determining a position relationship between any two of the plurality of target objects based on the position information of each of the plurality of target objects; determining the Edge Feature based on the position relationship between the any two target objects; and constructing the Visual Graph by the Node Feature and the Edge Feature.

According to an embodiment of the present disclosure, the determining the position relationship between any two of the plurality of target objects based on the position information of each of the plurality of target objects comprises: calculating an intersection and an union of position regions of the any two target objects according to position information of each of the any two target objects; calculating a ratio of the intersection and the union; indicating the position relationship between the any two target objects as 1, in response to the ratio being greater than a predetermined threshold; and indicating the position relationship between the any two target objects as 0, in response to the ratio being less than or equal to the predetermined threshold.

According to an embodiment of the present disclosure, the updating the Node Feature by using the Node Feature and the Edge Feature comprises: performing at least one round of updating operation on the Node Feature of the Visual Graph by using a predetermined neural network, wherein the predetermined neural network comprises a Fully Connected Layer, a first Graph Convolutional Layer and a second Graph Convolutional Layer. Wherein, each of the at least one round of updating operation comprises: mapping the Node Feature of the Visual Graph to a first feature by using the Fully Connected Layer, wherein a number of spatial dimensions of the first feature equals to a predetermined number; processing the first feature by using the first Graph Convolutional Layer to obtain a second feature; processing the second feature by using the second Graph Convolutional Layer to obtain the updated Node Feature; and constructing the updated Visual Graph by the updated Node Feature and the Edge Feature.

According to an embodiment of the present disclosure, each of the at least one round of updating operation further comprises: constructing a Graph Laplacians based on the Edge Feature. The processing the first feature by using the first Graph Convolutional Layer comprises: processing the first feature by using the first Graph Convolutional Layer based on the Graph Laplacians to obtain the second feature, wherein the second feature comprises a plurality of first sub-features.

According to an embodiment of the present disclosure, the predetermined neural network further comprises an association layer. Each of the at least one round of updating operation further comprises: calculating an association relationship between any two of the plurality of first sub-features by using the association layer, and determining a relationship matrix based on the association relationship between the any two first sub-features. The processing the second feature by using the second Graph Convolutional Layer comprises: processing the second feature by using the second Graph Convolutional Layer based on the relationship matrix to obtain the updated Node Feature.

According to an embodiment of the present disclosure, the association relationship between the any two first sub-features comprises: a Euclidean distance between the any two first sub-features; or a cosine similarity between the any two first sub-features.

According to an embodiment of the present disclosure, the determining the question feature based on the input question comprises: encoding the input question successively by using a Word Embedding Algorithm and a feature embedding algorithm to obtain the question feature.

According to an embodiment of the present disclosure, the updated Visual Graph comprises the updated Node Feature, and the updated Node Feature comprises a plurality of second sub-features. The fusing the updated Visual Graph and the question feature comprises: determining an attention weight between each of the plurality of second sub-features and the question feature based on an attention mechanism; performing weighted sum on the plurality of second sub-features by using the attention weight between each of the second sub-features and the question feature to obtain an adaptive feature; and fusing the adaptive feature and the question feature to obtain the fused feature.

According to an embodiment of the present disclosure, the fusing the adaptive feature and the question feature comprises: performing an Element-wise dot product operation on the adaptive feature and the question feature to obtain the fused feature.

According to an embodiment of the present disclosure, the generating the predicted answer for the input image and the input question based on the fused feature comprises: processing the fused feature by using a Multi-Layer Perceptron to obtain the predicted answer for the fused feature.

Another aspect of the present disclosure provides an apparatus for visual question answering, comprising: an acquiring module, a graph constructing module, an updating module, a question feature extracting module, a fusing module and a predicting module. The acquiring module is configured to acquire an input image and an input question. The graph constructing module is configured to construct a Visual Graph based on the input image, wherein the Visual Graph comprises a Node Feature and an Edge Feature. The updating module is configured to update the Node Feature by using the Node Feature and the Edge Feature to obtain an updated Visual Graph. The question feature extracting module is configured to determine a question feature based on the input question. The fusing module is configured to fuse the updated Visual Graph and the question feature to obtain a fused feature. The predicting module is configured to generate a predicted answer for the input image and the input question based on the fused feature.

According to an embodiment of the present disclosure, the graph constructing module comprises: a detecting sub-module, configured to process the input image by using an Object Detection Network to extract an appearance feature and a spatial feature of a plurality of target objects in the input image from a middle layer of the Object Detection Network; a Node Feature determining sub-module, configured to determine the Node Feature based on the appearance feature and the spatial feature; an Edge Feature determining sub-module, configured to determine position information of each of the plurality of target objects based on a processing result output by an output layer of the Object Detection Network, determine a position relationship between any two of the plurality of target objects based on the position information of each of the plurality of target objects, and determine the Edge Feature based on the position relationship between the any two target objects; and a graph constructing sub-module, configured to construct the Visual Graph by the Node Feature and the Edge Feature.

According to an embodiment of the present disclosure, the Edge Feature determining sub-module determining the position relationship between any two of the plurality of target objects based on the position information of each of the plurality of target objects comprises the Edge Feature determining sub-module configured to calculate an intersection and an union of position regions of the any two target objects according to position information of each of the any two target objects; calculate a ratio of the intersection and the union; indicate the position relationship between the any two target objects as 1, in response to the ratio being greater than a predetermined threshold; and indicate the position relationship between the any two target objects as 0, in response to the ratio being less than or equal to the predetermined threshold.

According to an embodiment of the present disclosure, the updating module is configured to perform at least one round of updating operation on the Node Feature of the Visual Graph by using a predetermined neural network, wherein the predetermined neural network comprises a Fully Connected Layer, a first Graph Convolutional Layer and a second Graph Convolutional Layer. The updating module comprises: a mapping sub-module, configured to map the Node Feature of the Visual Graph to a first feature by using the Fully Connected Layer, wherein a number of spatial dimensions of the first feature equals to a predetermined number; a first graph convolutional sub-module, configured to process the first feature by using the first Graph Convolutional Layer to obtain a second feature; a second graph convolutional sub-module, configured to process the second feature by using the second Graph Convolutional Layer to obtain the updated Node Feature; and an updating sub-module, configured to construct the updated Visual Graph by the updated Node Feature and the Edge Feature.

According to an embodiment of the present disclosure, the updating module further comprises: a first constructing sub-module, configured to construct a Graph Laplacians based on the Edge Feature. The first graph convolutional sub-module is configured to process the first feature by using the first Graph Convolutional Layer based on the Graph Laplacians to obtain the second feature, wherein the second feature comprises a plurality of first sub-features.

According to an embodiment of the present disclosure, the predetermined neural network further comprises an association layer. The updating module further comprises a second constructing sub-module, configured to calculate an association relationship between any two of the plurality of first sub-features by using the association layer, and determine a relationship matrix based on the association relationship between the any two first sub-features. The second graph convolutional sub-module is configured to process the second feature by using the second Graph Convolutional Layer based on the relationship matrix to obtain the updated Node Feature.

According to an embodiment of the present disclosure, the association relationship between the any two first sub-features comprises: a Euclidean distance between the any two first sub-features; or a cosine similarity between the any two first sub-features.

According to an embodiment of the present disclosure, the question feature extracting module is configured to encode the input question successively by using a Word Embedding Algorithm and a feature embedding algorithm to obtain the question feature.

According to an embodiment of the present disclosure, the updated Visual Graph comprises the updated Node Feature, and the updated Node Feature comprises a plurality of second sub-features. The fusing module comprises an attention sub-module, configured to determine an attention weight between each of the plurality of second sub-features and the question feature based on an attention mechanism; an adaptive sub-module, configured to perform weighted sum on the plurality of second sub-features by using the attention weight between each of the second sub-features and the question feature to obtain an adaptive feature; and a fusing sub-module, configured to fuse the adaptive feature and the question feature to obtain the fused feature.

According to an embodiment of the present disclosure, the fusing sub-module is specifically configured to perform an Element-wise dot product operation on the adaptive feature and the question feature to obtain the fused feature.

According to an embodiment of the present disclosure, the predicting module is specifically configured to process the fused feature by using a Multi-Layer Perceptron to obtain the predicted answer for the fused feature.

Another aspect of the present disclosure provides a computer device, comprising: a memory, processor and computer instructions stored on the memory and executable on the processor; wherein the processor, when executing the computer instructions, realizes the above-mentioned method.

Another aspect of the present disclosure provides a non-transitory computer-readable storage medium having computer instructions stored thereon that, when executed by a processor, realizes the above-mentioned method.

Another aspect of the present disclosure provides a computer program including computer-executable instructions that, when executed, perform the above-mentioned method.

BRIEF DESCRIPTION OF THE ACCOMPANYING DRAWINGS

Figure 2:
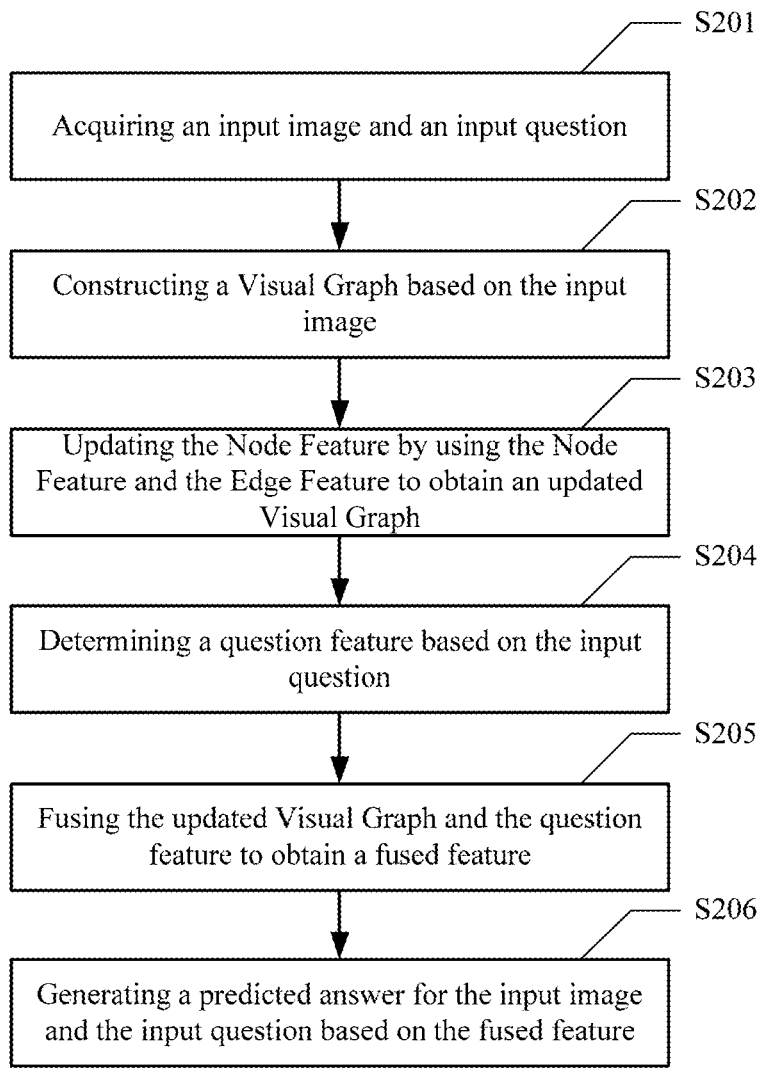
Figure 3A:
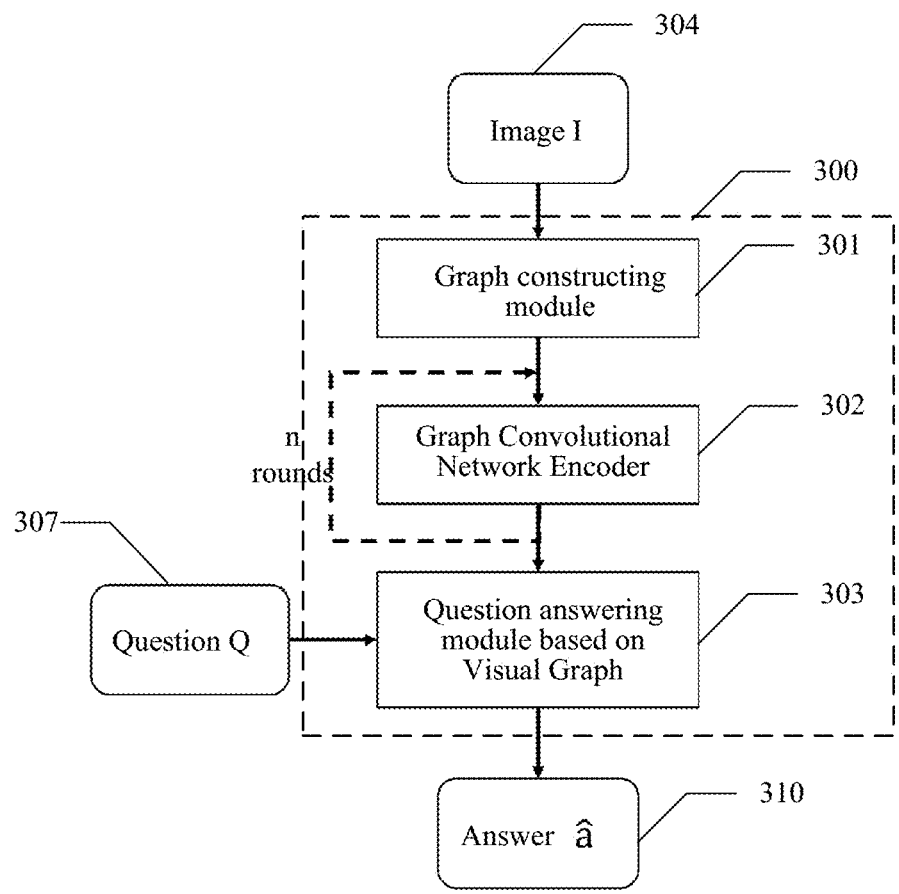
Figure 3B:
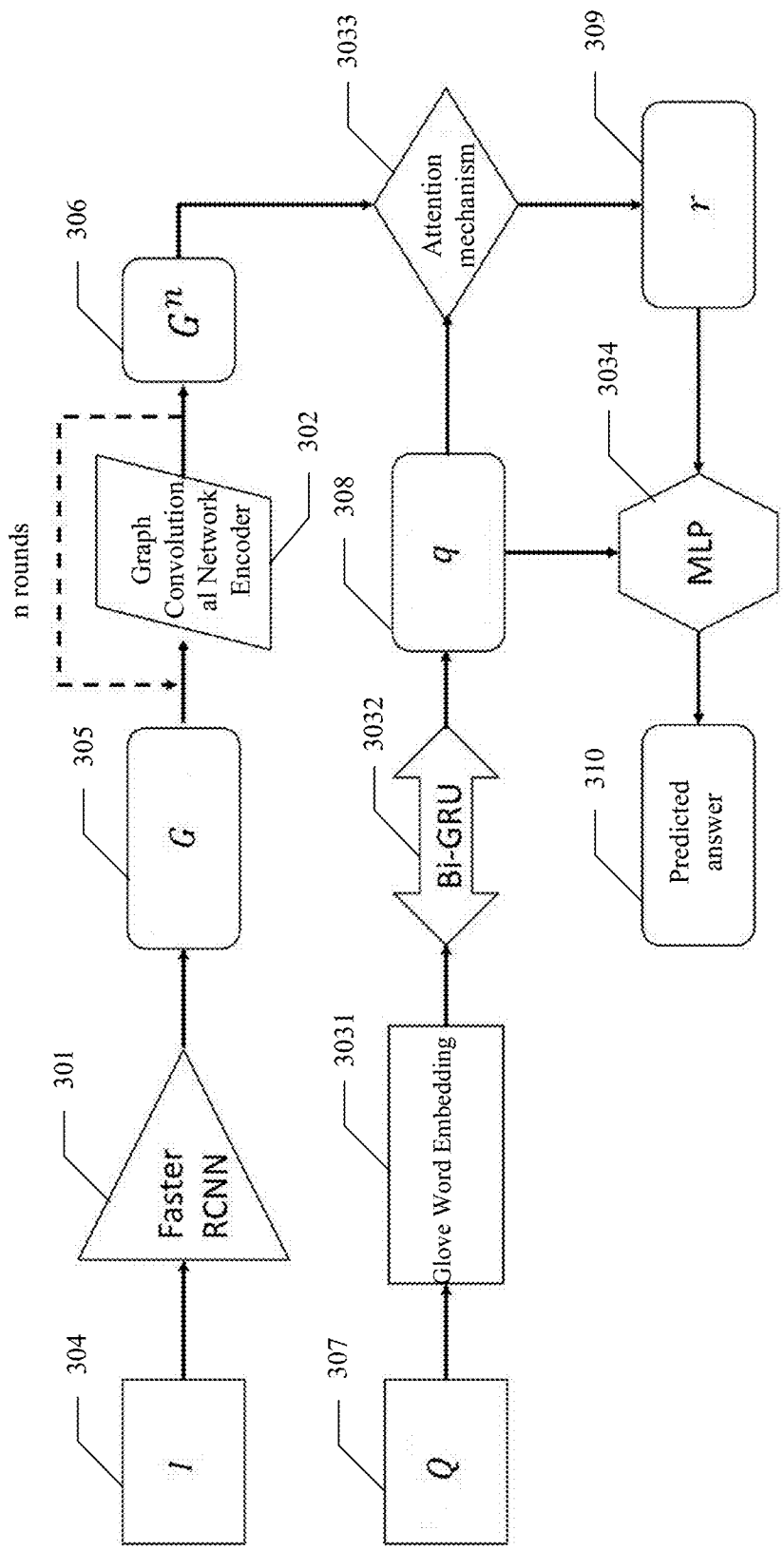
Figure 3C:
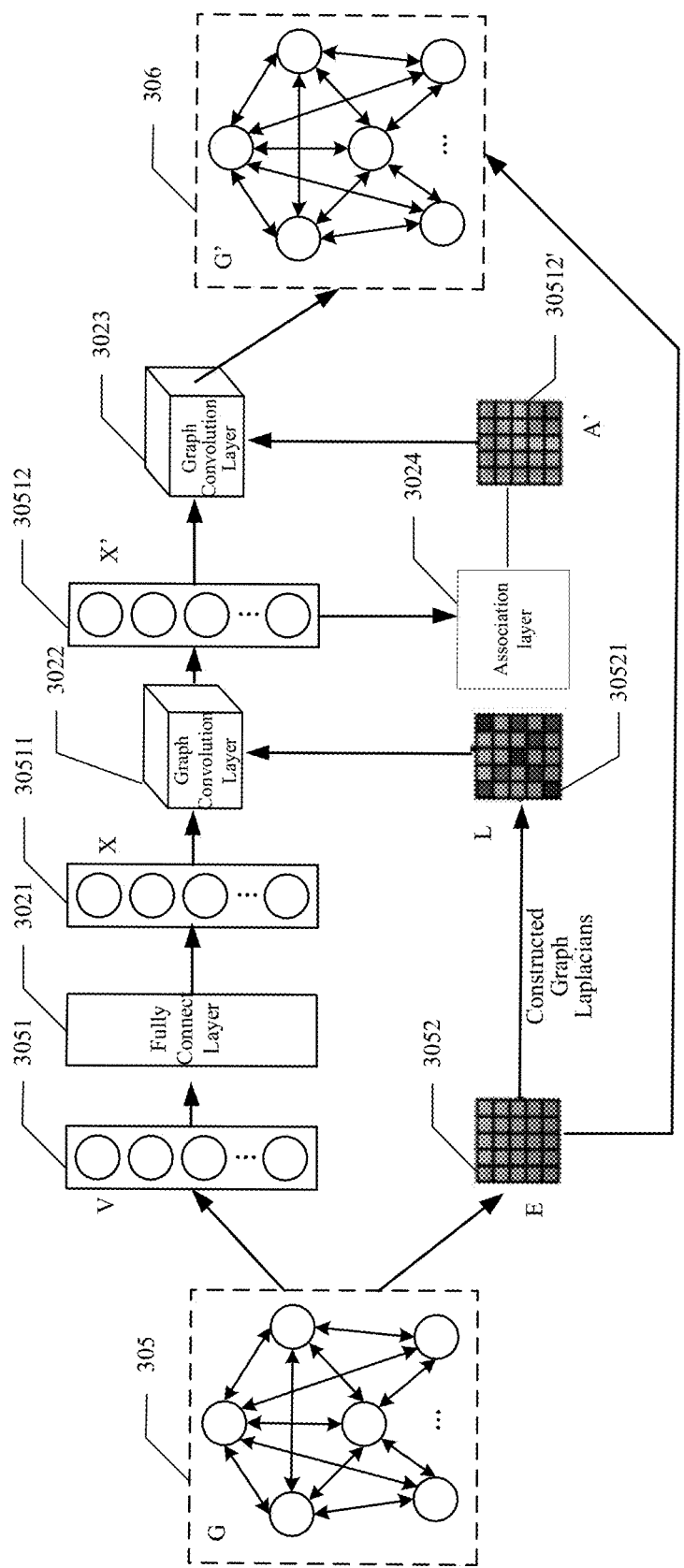
Figure 4:
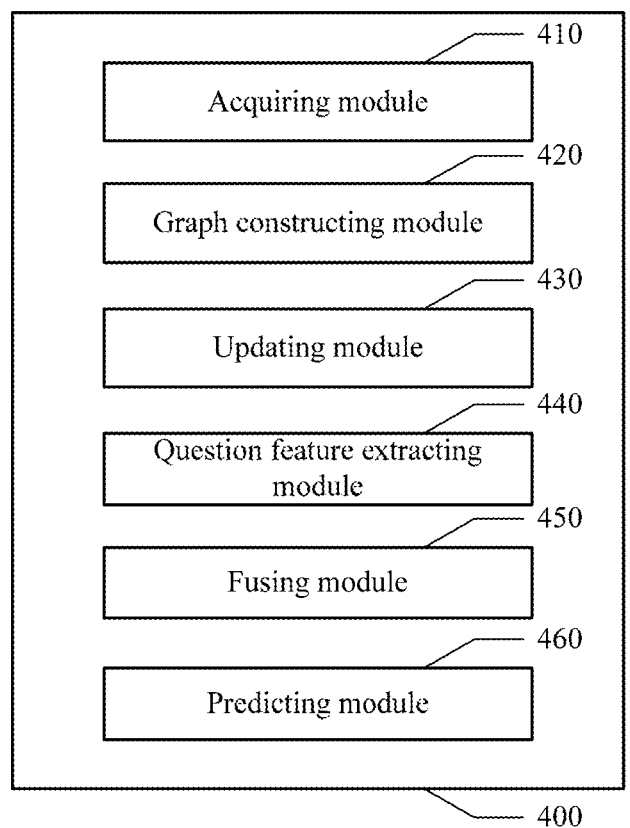
Figure 5:
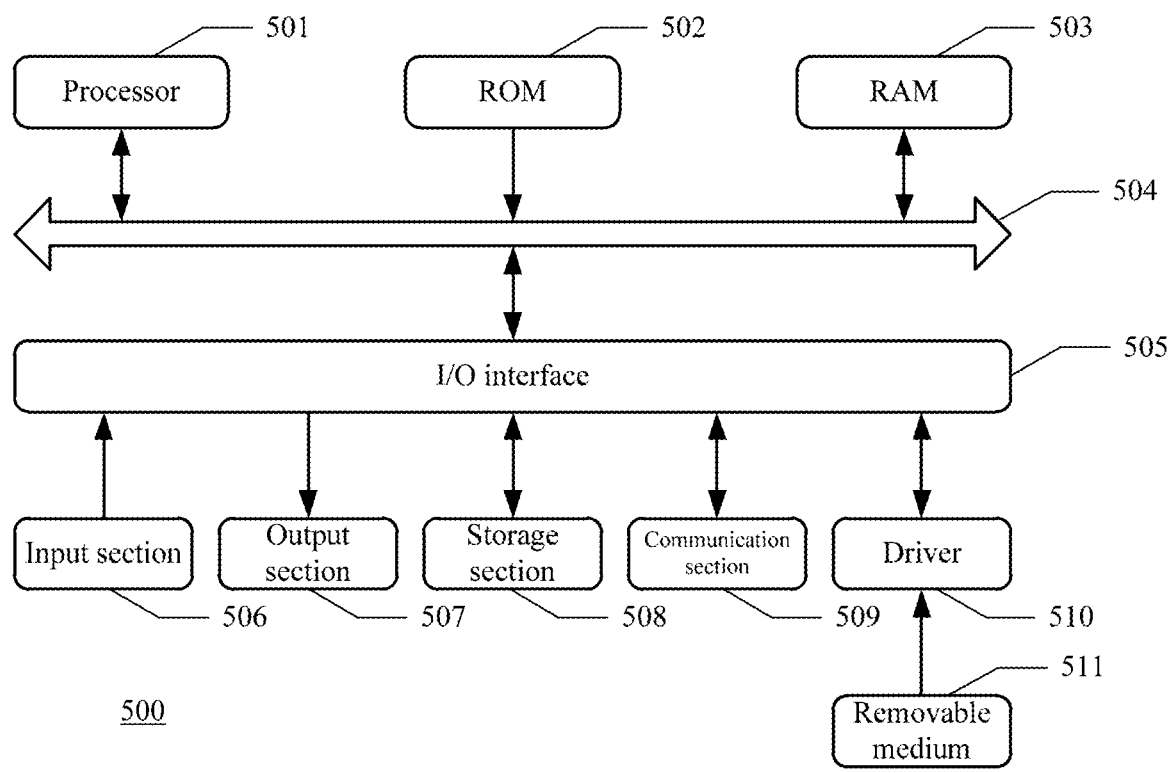

The above and other objects, features, and advantages of the present disclosure will be more apparent through the following description of embodiments of the present disclosure with reference to the accompanying drawings, in which:

FIG. 1 schematically shows an exemplary system architecture applying a method and an apparatus for visual question answering according to an embodiment of the present disclosure;

FIG. 2 schematically shows a flowchart of a method for visual question answering according to an embodiment of the present disclosure;

FIG. 3A schematically shows an exemplary diagram of a process of visual question answering according to an embodiment of the present disclosure;

FIG. 3B schematically shows an example diagram of a process of visual question answering according to another embodiment of the present disclosure;

FIG. 3C schematically shows an exemplary structure diagram of a Graph Convolution Network Encoder according to an embodiment of the present disclosure;

FIG. 4 schematically shows a block diagram of an apparatus for visual question answering according to an embodiment of the present disclosure; and FIG. 5 schematically shows a block diagram of a computer device according to an embodiment of the present disclosure.

DETAILED DESCRIPTION

Hereinafter, embodiments of the present disclosure will be described with reference to the accompanying drawings. It should be understood, however, that these descriptions are merely exemplary and are not intended to limit the scope of the present disclosure. In the following detailed description, for ease of interpretation, many specific details are set forth to provide a comprehensive understanding of the embodiments of the present disclosure. However, it is clear that one or more embodiments may also be implemented without these specific details. In addition, in the following description, descriptions of well-known structures and technologies are omitted to avoid unnecessarily obscuring the concepts of the present disclosure.

The terms used herein are for the purpose of describing specific embodiments only and are not intended to limit the present disclosure. The terms "comprising", "including", etc. used herein indicate the presence of the feature, step, operation and/or part, but do not exclude the presence or addition of one or more other features, steps, operations or parts.

All terms used herein (including technical and scientific terms) have the meanings generally understood by those skilled in the art, unless otherwise defined. It should be noted that the terms used herein shall be interpreted to have meanings consistent with the context of this specification, and shall not be interpreted in an idealized or too rigid way.

In the case of using the expression similar to "at least one of A, B and C", it should be explained according to the meaning of the expression generally understood by those skilled in the art (for example, "a system having at least one of A, B and C" should include but not be limited to a system having only A, a system having only B, a system having only C, a system having A and B, a system having A and C, a system having B and C, and/or a system having A, B and C).

In the case of using the expression similar to "at least one of A, B and C", it should be explained according to the meaning of the expression generally understood by those skilled in the art (for example, "a system having at least one of A, B and C" should include but not be limited to a system having only A, a system having only B, a system having only C, a system having A and B, a system having A and C, a system having B and C, and/or a system having A, B and C).

The embodiment of the present disclosure provides a method and an apparatus for visual question answering, a computer device and a medium. The method for visual question answering may include acquiring process, graph constructing process, updating process, question feature extracting process, fusing process and predicting process. In the acquiring process, an input image and an input question are acquired. The graph constructing process and the updating process are performed for the input image. In the graph constructing process, a Visual Graph is constructed, and the Visual Graph includes a Node Feature and an Edge Feature. In the updating process, the Node Feature is updated by using the Node Feature and the Edge Feature in the Visual Graph, to obtain an updated Visual Graph. The question feature extracting process is performed for the input question, to determine a question feature. Then the fusing process is performed to fuse the updated Visual Graph and the question feature to obtain a fused feature. The predicting process may be performed based on the fused feature, to generate a predicted answer for the input image and the input question.

Visual question answering is a challenging task, and a goal of visual question answering is to connect computer vision with natural language processing. In a visual question answering task, for example, given an image and a question related to the image, a machine is required to infer an answer for the question according to image content and some common sense. In order to complete the visual question answering task, the machine is ensured to have an ability of cross-modal understanding, to realize a comprehensive understanding of data under two different modalities of vision and language. Therefore, the visual question answering task has more requirements compared with other single modality tasks (such as image identification, document classification, etc.). Nowadays, a system for visual question answering is widely studied in academic and industrial circles. A goal of this kind of system for visual question answering is to design a reasonable model, so that the system for visual question answering may answer accurately for any question described by natural language and any given image after full understanding and reasoning. However, there are still some difficulties to overcome in a current system for visual question answering, such as cross-modal data fusing and effective relationship reasoning.

FIG. 1 schematically shows an exemplary system architecture applying a method and an apparatus for visual question answering according to an embodiment of the present disclosure. It should be noted that FIG. 1 is only an example of a system architecture in which the embodiments of the present disclosure may be applied, so as to help those skilled in the art to understand the technical content of the present disclosure. It does not mean that the embodiments of the present disclosure cannot be used for other apparatuses, systems or scenes.

As shown in FIG. 1, a system architecture 100 of this embodiment may include a plurality of terminal devices 110, a network 120, and a server 130. The terminal devices 110 may be various terminal devices, such as desktop, portable computer, smart phone, tablet computer, etc., and are not limited herein. The server 130 may be various electronic devices having certain computing ability, for example, the server 130 may be a server or a server cluster, and is not limited herein. The terminal devices 110 may be installed with software clients having various functions to interact with the server 130 by using a software client.

It may be understood that in an embodiment, the method for visual question answering according to the embodiment of the present disclosure may be performed by a terminal apparatus 110, and accordingly, the apparatus for visual question answering may be provided in the terminal apparatus 110. In another embodiment, the method for visual question answering according to the embodiment of the present disclosure may be performed by the server 130, and accordingly, the apparatus for visual question answering may be provided in the server 130. In another embodiment, the method for visual question answering according to the embodiment of the present disclosure may be performed by other devices capable of communicating with a terminal device 110 and/or the server 130, and accordingly, the apparatus for visual question answering may be provided in the other devices.

In recent years, visual question answering has developed rapidly, and has received extensive attention from fields of computer vision and natural language processing. Many solutions have been proposed in various fields to solve a task of visual question answering. Most of the solutions perform an end-to-end process. For example, a pre-trained convolutional neural network is used to extract an image feature, a recurrent neural network is used to indicate a question, and the image feature and the question feature are connected to predict an answer. At present, the following three models are widely used in a project for visual question answering: (1) a coarse-grained cross-modal representing model for visual question answering; (2) a fine-grained cross-modal representing model for visual question answering based on an attention mechanism; and (3) a model for visual question answering based on external knowledge or knowledge network.

Model (1) is a most direct model for visual question answering. Cross-modal feature fusing is a core of this kind of model, but in response to processing content being relatively complex and there being images of many subjects, more noise may inevitably be introduced, and the noise may affect accuracy of answer predicting. Processing for question text also has a same problem, in response to a question sentence being relatively long and there being multiple words related to an image, the model is difficult to capture a keyword expected by a questioner, leading to a poor accuracy of answer predicting. Model (2) is obtained by introducing an attention mechanism based on the above-mentioned coarse-grained cross-modal model, greatly improving representing ability of a fine-grained cross-modal feature. However, most of attention models used in current models for visual question answering are based on a characteristic of a question to learn an interested region of an image, and ignore attention learning of the question itself, i.e., ignore attention learning of a keyword or key phrase in the question, resulting in poor accuracy of answer predicting. A difficulty of model (3) is that an existing model is not easy to map external knowledge to all questions on a data set for visual question answering, may only solve some kinds of questions, and is lack of universality.

From the above analysis, the current project for visual question answering has the following questions: first, cross-modal fusing strategy is not good, in response to a complex fusing model is introduced, computing efficiency of the model is greatly reduced. Therefore, a research on how to reduce computing overhead while ensuring effective feature fusing is a key development direction in visual question answering. Moreover, ability of relationship reasoning is not enough. In many real processes of visual question answering, a model is intended to find a final answer by using multi-step relationship reasoning. However, the current model only answers questions by using multi-modal feature fusing, causing understanding and reasoning of complex questions ineffective.

According to an embodiment of the present disclosure, a method for visual question answering is provided. This method is illustrated by exemplary drawings. It should be noted that a serial number for each operation in the following method is only used as representation of the operation for description, and should not be regarded as representing a performing order of each operation. Unless explicitly indicated, the method is not intended to be performed exactly in the shown order.

FIG. 2 schematically shows a flowchart of a method for visual question answering according to an embodiment of the present disclosure.

As shown in FIG. 2, the method may include operation S201 to operation S206.

In operation S201, an input image and an input question are acquired.

In operation S202, a Visual Graph is constructed based on the input image.

According to an embodiment of the present disclosure, the Visual Graph is a topological structure representation of the input image, and is used to more comprehensively and accurately represent feature information of the input image. For example, the Visual Graph may include a Node Feature and an Edge Feature. The Node Feature is used to represent feature information of one or more target objects in the input image, and the Edge Feature is used to represent a potential relationship between target objects in the input image.

In operation S203, the Node Feature is updated by using the Node Feature and the Edge Feature to obtain an updated Visual Graph.

According to an embodiment of the present disclosure, explicit and implicit relationships in the Node Feature may be learned based on an originally constructed Node Feature and an originally constructed Edge Feature. The explicit and implicit relationships are used to update the Node Feature, so that the updated Visual Graph may represent a deeper semantic relationship in the input image.

In operation S204, a question feature is determined based on the input question.

In operation S205, the updated Visual Graph and the question feature are fused to obtain a fused feature.

In operation S206, a predicted answer for the input image and the input question is generated based on the fused feature.

Those skilled in the art may understand that the method for visual question answering according to the embodiment of the present disclosure, after acquiring an input image and an input question, represents feature information of a target object in the image and a potential relationship between target objects by constructing a topological structure (Visual Graph) for the input image, so as to reduce noise impact in response to the input image being relatively complex. The Node Feature in the Visual Graph is updated to obtain an updated Visual Graph, and the updated Visual Graph represents shallow and deep semantic features of the input image more comprehensively and accurately. On this basis, the updated Visual Graph and the question feature are fused, and a final answer is predicted based on the fused feature. Due to optimization of the feature representation of the input image in an early stage, reasoning ability of a process of visual question answering for complex input is effectively enhanced, making the process of visual question answering according to the embodiment of the present disclosure more interpretable.

With reference to FIG. 3A, FIG. 3B and FIG. 3C, the method for visual question answering according to the embodiment of the present disclosure may be illustrated with specific embodiments.

FIG. 3A schematically shows an exemplary diagram of a process of visual question answering according to an embodiment of the present disclosure. FIG. 3B schematically shows an example diagram of a process of visual question answering according to another embodiment of the present disclosure.

In an example shown in FIG. 3A, a network model 300 may be constructed in advance, and the network model 300 may include the following modules connected in sequence: a graph constructing module 301, one or more Graph Convolution Network Encoders (GCN Encoders) 302 connected in series, and a question answering module 303 based on Visual Graph. According to an embodiment of the present disclosure, the network model 300 is intended to be trained so that the network model 300 has an ability to perform the task of visual question answering as shown in FIG. 2. In a training process, a sample image and a sample question are input into the network model 300, and a parameter of the network model 300 may be optimized according to a difference between an output of the network model 300 and a sample label until an objective function of the network model 300 converges. The sample label is a real answer for the sample image and the sample question. Then, the training for the network model 300 is completed, and the method for visual question answering according to an embodiment of the present disclosure may be performed by using the trained network model 300. The following is an example of the performing process.

According to an embodiment of the present disclosure, as shown in FIG. 3A, the graph constructing module 301 in the network model 300 acquires an input image I 304, and the graph constructing module 301 may be used to perform the above operation S202, constructing a Visual Graph based on the input image. Exemplarily, the graph constructing module 301 may process the input image I 304 by using an Object Detection Network to extract an appearance feature and a spatial feature for a plurality of target objects in the input image from a middle layer of the Object Detection Network, and determine the Node Feature based on the appearance feature and spatial feature. Position information of each of the plurality of target objects is determined based on a processing result output by an output layer of the Object Detection Network. A position relationship between any two of the plurality of target objects is determined based on the position information of each of the plurality of target objects. Then, the Edge Feature is determined based on the position relationship between the any two target objects. Thus, the Visual Graph is constructed by the Node Feature and the Edge Feature.

In an example shown in FIG. 3B, the graph constructing module 301 detects $K_1$ target objects in the input image I 304 by using a Faster RCNN (Faster Region Convolutional Neural Network), and extracts an appearance feature F∈ $\mathbb{R}^{K_1*2048}$ and a spatial feature S∈ $\mathbb{R}^{K_1*4}$ of the target objects after ROI Pooling on the whole feature map. The appearance feature F may include $K_1$ sub-features for $K_1$ target objects, each sub-feature may be represented as a vector having 2048 spatial dimensions, the number of spatial dimensions may be set according to demand, and here is just an example. The spatial feature S may further include $K_1$ sub-features for $K_1$ target objects, and each sub-feature may be represented as a vector having 4 spatial dimensions, for example including a height value, a width value and a center point coordinate for a bounding box of the target object. Then, the appearance feature F and the spatial feature S are combined as a Node Feature V={F||S} of the Visual Graph G 305, the combining manner may be connection combining.

The Edge Feature of the Visual Graph G 305 may be a binary representation E={0,1}$^{K_1*K_1}$, the Edge Feature may be determined based on a position relationship between any two target objects in the input image I 304. According to an embodiment of the present disclosure, the any two target objects may include different target objects or a same target object. Through the processing of the above Object Detection Network, a position coordinate for each target object in the input image I 304 may be obtained, and a position region for each target object may be determined.

Exemplarily, a value of each element in the Edge Feature E may be determined by determining whether an Intersection-over-Union (IoU) between position regions of any two target objects is greater than a predetermined threshold. For example, setting the predetermined threshold value to 0.3, for an i-th target object and a j-th target object in the input image, an IoU value between position regions of the i-th target object and the j-th target object is calculated. In response to the IoU value being greater than the predetermined threshold, an element $e_{ij}$ in the Edge Feature E is indicated as 1; and in response to the IoU value being less than or equal to the predetermined threshold, the element $e_{ij}$ in the Edge Feature E is indicated as 0. In the embodiment, i and j are both positive integers greater than or equal to 1 and less than or equal to $K_1$, and i and j may be the same or different.

According to the above exemplary embodiment, a visual diagram G={V,E} may be constructed. As shown in FIGS. 3A and 3B, the Visual Graph G 305 is input into the Graph Convolution Network Encoder 302 for processing, and the Graph Convolution Network Encoder 302 is used to learn a relationship between nodes in the Visual Graph and update a feature based on a method of Graph Convolution Network (GCN). The following is an exemplary description of the performing process.

According to an embodiment of the present disclosure, the above operation S203 updating the Node Feature by using the Node Feature and the Edge Feature may be performed in a following manner. At least one round of updating operation on the Node Feature of the Visual Graph is performed by using a predetermined neural network. In an example, the predetermined neural network may include one or more Graph Convolution Network Encoders 302.

FIG. 3C schematically shows an exemplary structure diagram of a Graph Convolution Network Encoder according to an embodiment of the present disclosure. As shown in FIG. 3C, the Graph Convolution Network Encoder 302 may include a Fully Connected Layer (FC) 3021, a first Graph Convolutional Layer (Gconv$_1$) 3022 and a second Graph Convolutional Layer (Gconv$_2$) 3023. Exemplarily, each of the at least one round of updating operation includes the following operations. The Node Feature V 3051 of the Visual Graph G 305 is mapped to a first feature X 30511 by using the Fully Connected Layer 3021, wherein a number of spatial dimensions of the first feature equals to a predetermined number d. The first feature X 30511 is processed by using the first Graph Convolutional Layer 3022 to obtain a second feature X' 30512. The second feature X' 30512 is processed by using the second Graph Convolutional Layer 3023 to obtain the updated Node Feature X". The updated Visual Graph G' 306 is constructed by the updated Node Feature X" and the Edge Feature E 3052.

For example, the process of mapping the Node Feature V 3051 of the Visual Graph G 305 to the first feature X 30511 by using the Fully Connected Layer 3021, wherein a number of spatial dimensions of the first feature equals to a predetermined number d may be represented as Formula (1).

$$X=\sigma(W_1 *V) \qquad \text{Formula (1)}$$

Wherein, σ is a nonlinear function and $W_1$ is a weight parameter of the Fully Connected Layer.

According to an embodiment of the present disclosure, a Node Feature may be updated and an explicit relationship may be learned by using the first Graph Convolutional Layer 3022 according to the Edge Feature E 3052 of the Visual Graph G 305. As shown in FIG. 3C, each of the at least one round of updating operation may further include: constructing a Graph Laplacians L 30521 based on the Edge Feature E 3052. The process of processing the first feature X 30511 by using the first Graph Convolutional Layer 3022 may include: processing the first feature X 30511 by using the first Graph Convolutional Layer 3022 based on the Graph Laplacians L 30521 to obtain the second feature X' 30512. The second feature X' 30512 includes a plurality of first sub-features $x_i'$, wherein i is an integer greater than or equal to 1 and less than or equal to $K_1$, $x_i'$ may be represented as a vector having d spatial dimensions. The process of calculating the second feature X' and the process of constructing the Graph Laplacians may be shown in formulas (2) and (3) respectively.

$$X'=\sigma(W_2(X+W_3(LX))) \qquad \text{Formula (2)}$$

$$L=(D)^{-1/2}E(D)^{1/2} \qquad \text{Formula (3)}$$

Wherein, D∈$\mathbb{R}^{K_1*K_i}$ is a diagonal matrix, D=$\Sigma_{j\in K_1}e_{ij}$, $e_{ij}$ ∈E. σ is a nonlinear function, $W_2$ and $W_3$ are weight parameters of the first Graph Convolutional Layer.

To further learn the implicit relationship in the input image, according to an embodiment of the present disclosure, as shown in FIG. 3C, the Graph Convolution Network Encoder 302 may further include an association layer (Adj) 3024. After the processing of the first Graph Convolutional Layer 3022 is completed, an association relationship between any two of the plurality of first sub-features $x_i'$ and $x_j'$ may be calculated by using the association layer 3024, and a relationship matrix A' 30512' may be determined based on the association relationship between the any two first sub-features.

Wherein, A'={$a_{ij}$'}, i,j∈{1, ..., $K_1$}. A specific representation is shown in Formula (4).

$$a_{ij}' = \frac{\exp^{SIM(x_i',x_j')}}{\sum_{j\in K_1}\exp^{SIM(x_i',x_j')}} \qquad \text{Formula (4)}$$

$$SIM(x_i', x_j') = \|x_i' - x_j'\|_2^2$$

As may be seen from Formula (4), this example determines an association relationship between $x_i'$ and $x_j'$ by calculating an L-2 distance (Euclidean distance) between $x_i'$ and $x_j'$. In other examples, any method for calculating similarity may be used to determine the association relationship between $x_i'$ and $x_j'$, such as a cosine similarity, etc., and is not limited herein. According to the embodiment, the implicit relationship matrix between graph nodes may be learned by using the association layer.

On this basis, the second feature X 30512 may be processed by using the second Graph Convolutional Layer 3023. For example, a Node Feature at a deep level may be updated and learned by using the second Graph Convolutional Layer 3023 according to the learned relationship matrix A'. The updating strategy of the second Graph Convolutional Layer 3023 may be defined as Formula (5).

$$X''=X'+W_4(A'X') \qquad \text{Formula (5)}$$

Wherein $W_4$ is a weight parameter of the second Graph Convolutional Layer.

After two layers of Graph Convolution Network, as shown in FIG. 3C, an output of the whole Graph Convolution Network Encoder 302 is the updated Visual Graph G' 306, G'={X", E}. X" is the updated Node Feature, including a plurality of second sub-features $x_i''$, wherein i is an integer greater than or equal to 1 and less than or equal to $K_1$. In order to achieve better updating effect, several Graph Convolution Network Encoders may be connected in series in the network model according to an embodiment of the present disclosure to realize a plurality of rounds of updating for the Node Feature of the Visual Graph, to learn a deeper semantic relationship. For example, by using n Graph Convolution Network Encoders, n rounds of updating may be realized to obtain an updated Visual Graph $G^n$ 306, wherein n is a positive integer.

With reference to FIG. 3A and FIG. 3B, after the introduction of the Graph Convolution Network Encoder 302, an implementation of the question answering module 303 based on Visual Graph is illustrated by an example. After several Graph Convolution Network Encoders, each Node Feature in the Visual Graph is fused with a feature of a related node according to the learned relationship, including a deep semantic feature to a certain extent. Then, the learned feature is intended to be used to finally answer the question.

According to an embodiment of the present disclosure, the question answering module 303 based on Visual Graph may be used to perform the above operations S204 to S206. On one hand, as shown in FIGS. 3A and 3B, the question answering module 303 based on Visual Graph acquires an input question Q 307, and encode the input question 307 successively by using a Word Embedding Algorithm 3031 and a feature embedding algorithm 3032 to obtain a question feature q 308. In the embodiment, a Glove Word Embedding Algorithm and a Bi-GRU feature embedding algorithm are used to obtain a feature representation q of the whole question. On the other hand, as shown in FIG. 3A, the question answering module 303 based on Visual Graph acquires the updated Visual Graph 306 output by the Graph Convolution Network Encoder 302, and may perform the process of fusing the updated Visual Graph and the question feature.

In an embodiment of the present disclosure, as shown in FIG. 3B, the question answering module 303 based on Visual Graph may use an attention mechanism 3033 to learn and update an attention map $S \in \mathbb{R}^{1*K_1}$ between each second sub-feature $x_i'' \in X''$ and the question feature q on the Visual Graph, for example, to calculate a specific formula as shown in Formula (6).

$$S(x_i'', q) = \frac{(x_i'')^T q}{\sqrt{d}}$$ Formula (6)

Then, for example, the attention map performs weighted sum on the second sub-features of the Node Feature $X'' \in \mathbb{R}^{K_1*d}$ in the updated Visual Graph to obtain a final adaptive feature representation $r \in \mathbb{R}^{1*d}$ (may further be called Reasoning Feature r 309) for answering the question. The calculation method may be shown in Formula (7).

$$r = SX''$$ Formula (7)

According to an embodiment of the present disclosure, the question answering module 303 based on Visual Graph may further include a Multi-Layer Perceptron (MLP) 3034. As shown in FIG. 3B, the above process of fusing the adaptive feature and the question feature may include: performing an Element-wise dot product operation on the adaptive feature r and the question feature q to obtain the fused feature. Then the fused feature is transmitted into the MLP to predict a final answer â 310. In the embodiment, a two-layer MLP is used, and the processing process is shown in Formula (8).

$$â = \max(\sigma(MLP(q \circ r)))$$ Formula (8)

It may be understood that when using a trained network model, an input image and an input question to be predicted are input into the above network model, to output a corresponding answer category and a confidence level by the network model, and an answer category having a highest confidence level is used as the predicted answer for the input image and the input question to be predicted. The above processing process for the input image and the input question is similar to a processing process for a sample image and a sample question in a training stage, and will not be repeated here.

According to the embodiments described above, the method for visual question answering according to an embodiment of the present disclosure represents feature information of a target in the image and a potential relationship between targets by constructing a topological structure (Visual Graph) for the image. Then a Graph Convolution Network is used to learn the explicit and implicit relationships between targets in the image and perform effective feature coding, so that the model may learn adaptive feature representations having more reasoning features, and finally the learned reasoning feature and the question feature are fused to predict a final answer. The method for visual question answering according to an embodiment of the present disclosure may effectively enhance reasoning ability of a model for complex input, making the process of question answering more interpretable.

FIG. 4 schematically shows a block diagram of an apparatus for visual question answering according to an embodiment of the present disclosure.

As shown in FIG. 4, the apparatus for visual question answering 400 may include an acquiring module 410, a graph constructing module 420, an updating module 430, a question feature extracting module 440, a fusing module 450, and a predicting module 460.

The acquiring module 410 is used to acquire an input image and an input question.

The graph constructing module 420 is used to construct a Visual Graph based on the input image, and the Visual Graph includes Node Feature and an Edge Feature.

The updating module 430 is used to update the Node Feature by using the Node Feature and the Edge Feature to obtain an updated Visual Graph.

The question feature extracting module 440 is used to determine a question feature based on the input question.

The fusing module 450 is used to fuse the updated Visual Graph and the question feature to obtain a fused feature.

The predicting module 460 is used to generate a predicted answer for the input image and the input question based on the fused feature.

It should be noted that the implementation mode, solved technical questions, realized functions and achieved technical effects of each module/unit/sub unit in the embodiment of the device part are respectively the same as or similar to the implementation mode, solved technical questions, realized functions and achieved technical effects of each corresponding step in the embodiment of the method part, and will not be repeated here.

Any multiple of the modules, sub modules, units and sub units according to the embodiments of the present disclosure, or at least part of the functions of any number of them may be implemented in one module. Any one or more of the modules, sub modules, units and sub units according to the embodiments of the present disclosure may be split into multiple modules for implementation. Any one or more of the modules, sub modules, units and sub units according to the embodiments of the present disclosure may be implemented at least partially as a hardware circuit, such as a field programmable gate array (FPGA), a programmable logic array (PLA), a system on a chip, a system on a substrate, a system on a package, an Application Specific Integrated Circuit (ASIC), or may be implemented by hardware or firmware in any other reasonable way that integrates or encapsulates the circuit, or may be implemented by any one of the three implementation modes of software, hardware and firmware or an appropriate combination thereof. Alternatively, one or more of the modules, sub modules, units and sub units according to the embodiments of the present disclosure may be at least partially implemented as a computer program module that, when executed, performs the corresponding functions.

For example, any multiple of the acquiring module 410, the graph constructing module 420, the updating module 430, the question feature extracting module 440, the fusing module 450, and the predicting module 460 may be integrated into one module for implementation, or any one of them may be split into multiple modules. Alternatively, at least part of the functions of one or more of these modules may be combined with at least part of the functions of other modules and implemented in one module. According to the embodiments of the present disclosure, at least one of the acquiring module 410, the graph constructing module 420, the updating module 430, the question feature extracting module 440, the fusing module 450, and the predicting module 460 may be may be implemented at least partially as a hardware circuit, such as a field programmable gate array (FPGA), a programmable logic array (PLA), a system on a chip, a system on a substrate, a system on a package, an Application Specific Integrated Circuit (ASIC), or may be implemented by hardware or firmware in any other reasonable way that integrates or encapsulates the circuit, or may be implemented by any one of the three implementation modes of software, hardware and firmware or an appropriate combination thereof. Alternatively, at least one of the acquiring module 410, the graph constructing module 420, the updating module 430, the question feature extracting module 440, the fusing module 450, and the predicting module 460 may be at least partially implemented as a computer program module that, when executed, performs the corresponding functions.

FIG. 5 schematically shows a block diagram of a computer device according to an embodiment of the present disclosure. The computer device shown in FIG. 5 is only an example and should not bring any limitation to the function and scope of use of the embodiments of the present disclosure.

As shown in FIG. 5, a computer device 500 according to the embodiment of the present disclosure includes a processor 501, which may execute various appropriate actions and processing according to the program stored in a read only memory (ROM) 502 or the program loaded into a random access memory (RAM) 503 from a storage section 508. The processor 501 may, for example, include a general-purpose microprocessor (for example, CPU), an instruction set processor and/or a related chipset and/or a special-purpose microprocessor (for example, an application specific integrated circuit (ASIC)), and the like. The processor 501 may also include an on-board memory for caching purposes. The processor 501 may include a single processing unit or multiple processing units for executing different actions of the method flow according to the embodiments of the present disclosure.

Various programs and data required for the operation of the device 500 are stored in the RAM 503. The processor 501, the ROM 502 and the RAM 503 are connected to each other through a bus 504. The processor 501 executes various operations of the method flow according to the embodiments of the present disclosure by executing the programs in the ROM 502 and/or the RAM 503. It should be noted that the program may also be stored in one or more memories other than the ROM 502 and the RAM 503. The processor 501 may also execute various operations of the method flow according to the embodiments of the present disclosure by executing the programs stored in the one or more memories.

According to the embodiment of the present disclosure, the device 500 may further include an input/output (I/O) interface 505 which is also connected to the bus 504. The device 500 may further include one or more of the following components connected to the I/O interface 505: an input section 506 including a keyboard, a mouse, etc.; an output section 507 including a cathode ray tube (CRT), a liquid crystal display (LCD), etc. and a speaker, etc.; a storage section 508 including a hard disk, etc.; and a communication section 509 including a network interface card such as a LAN card, a modem, and the like. The communication section 509 performs communication processing via a network such as the Internet. A drive 510 is also connected to the I/O interface 505 as required. A removable medium 511, such as a magnetic disk, an optical disk, a magneto-optical disk, a semiconductor memory, and the like, is installed on the drive 510 as required, so that the computer program read therefrom is installed into the storage section 508 as needed.

The method flow according to the embodiments of the present disclosure may be implemented as a computer software program. For example, the embodiments of the present disclosure include a computer program product including a computer program carried on a computer-readable storage medium. The computer program includes a program code for execution of the method shown in the flowchart. In such an embodiment, the computer program may be downloaded and installed from the network through the communication section 509, and/or installed from the removable medium 511. When the computer program is executed by the processor 501, the above-mentioned functions defined in the system of the embodiment of the present disclosure are performed. According to the embodiments of the present disclosure, the above-described systems, apparatuses, devices, modules, units, etc. may be implemented by computer program modules.

The present disclosure also provides a non-transitory computer-readable storage medium, which may be included in the apparatus/device/system described in the above embodiments; or exist alone without being assembled into the apparatus/device/system. The above-mentioned computer-readable storage medium carries one or more programs that when executed, perform the method according to the embodiments of the present disclosure.

According to the embodiments of the present disclosure, the non-transitory computer-readable storage medium may be a non-volatile computer-readable storage medium, for example, may include but not limited to: portable computer disk, hard disk, random access memory (RAM), read-only memory (ROM), erasable programmable read-only memory (EPROM or flash memory), portable compact disk read-only memory (CD-ROM), optical storage device, magnetic storage device, or any suitable combination of the above. In the present disclosure, the computer-readable storage medium may be any tangible medium that includes or stores programs that may be used by or in combination with an instruction execution system, apparatus, or device. For example, according to the embodiments of the present disclosure, the computer-readable storage medium may include the above-mentioned ROM 502 and/or RAM 503 and/or one or more memories other than the ROM 502 and RAM 503.

The flowcharts and block diagrams in the drawings illustrate the possible architecture, functions, and operations of the system, method, and computer program product according to various embodiments of the present disclosure. In this regard, each block in the flowcharts or block diagrams may represent a part of a module, program segment, or code, which part includes one or more executable instructions for implementing the specified logical function. It should also be noted that, in some alternative implementations, the functions noted in the blocks may also occur in a different order than that noted in the accompanying drawings. For example, two blocks shown in succession may actually be executed substantially in parallel, or they may sometimes be executed in the reverse order, depending on the functions involved. It should also be noted that each block in the block diagrams or flowcharts, and the combination of blocks in the block diagrams or flowcharts, may be implemented by a dedicated hardware-based system that performs the specified functions or operations, or may be implemented by a combination of dedicated hardware and computer instructions.

Those skilled in the art may understand that the various embodiments of the present disclosure and/or the features described in the claims may be combined in various ways, even if such combinations are not explicitly described in the present disclosure. In particular, without departing from the spirit and teachings of the present disclosure, the various embodiments of the present disclosure and/or the features described in the claims may be combined in various ways. All these combinations fall within the scope of the present disclosure.

The embodiments of the present disclosure have been described above. However, these embodiments are for illustrative purposes only, and are not intended to limit the scope of the present disclosure. Although the embodiments have been described separately above, this does not mean that measures in the respective embodiments cannot be used in combination advantageously. The scope of the present disclosure is defined by the appended claims and their equivalents. Without departing from the scope of the present disclosure, those skilled in the art may make various substitutions and modifications, and these substitutions and modifications should all fall within the scope of the present disclosure.

We claim:

1. A method for visual question answering, comprising:
acquiring an input image and an input question;
constructing a Visual Graph based on the input image, wherein the Visual Graph comprises a Node Feature and an Edge Feature;
updating the Node Feature by using the Node Feature and the Edge Feature to obtain an updated Visual Graph;
determining a question feature based on the input question;
fusing the updated Visual Graph and the question feature to obtain a fused feature; and
generating a predicted answer for the input image and the input question based on the fused feature,
wherein the updating the Node Feature by using the Node Feature and the Edge Feature comprises:
performing at least one round of updating operation on the Node Feature of the Visual Graph by using a predetermined neural network, wherein the predetermined neural network comprises a Fully Connected Layer, a first Graph Convolutional Layer and a second Graph Convolutional Layer,
wherein each of the at least one round of updating operation comprises:
mapping the Node Feature of the Visual Graph to a first feature by using the Fully Connected Layer, wherein a number of spatial dimensions of the first feature equals to a predetermined number;
processing the first feature by using the first Graph Convolutional Layer to obtain a second feature;
processing the second feature by using the second Graph Convolutional Layer to obtain the updated Node Feature; and
constructing the updated Visual Graph by the updated Node Feature and the Edge Feature, wherein each of the at least one round of updating operation further comprises: constructing a Graph Laplacians based on the Edge Feature; and
wherein the processing the first feature by using the first Graph Convolutional Layer comprises: processing the first feature by using the first Graph Convolutional Layer based on the Graph Laplacians to obtain the second feature, wherein the second feature comprises a plurality of first sub-features.

2. The method of claim 1, wherein the constructing the Visual Graph based on the input image comprises:
processing the input image by using an Object Detection Network to extract an appearance feature and a spatial feature of a plurality of target objects in the input image from a middle layer of the Object Detection Network;
determining the Node Feature based on the appearance feature and the spatial feature;
determining position information of each of the plurality of target objects based on a processing result output by an output layer of the Object Detection Network;
determining a position relationship between any two of the plurality of target objects based on the position information of each of the plurality of target objects;
determining the Edge Feature based on the position relationship between the any two target objects; and
constructing the Visual Graph by the Node Feature and the Edge Feature.

3. The method of claim 2, wherein the determining the position relationship between any two of the plurality of target objects based on the position information of each of the plurality of target objects comprises:
calculating an intersection and an union of position regions of the any two target objects according to position information of each of the any two target objects;
calculating a ratio of the intersection and the union;
indicating the position relationship between the any two target objects as 1, in response to the ratio being greater than a predetermined threshold; and
indicating the position relationship between the any two target objects as 0, in response to the ratio being less than or equal to the predetermined threshold.

4. The method of claim 1, wherein the predetermined neural network further comprises an association layer;
wherein each of the at least one round of updating operation further comprises: calculating an association relationship between any two of the plurality of first sub-features by using the association layer, and determining a relationship matrix based on the association relationship between the any two first sub-features; and
wherein the processing the second feature by using the second Graph Convolutional Layer comprises: processing the second feature by using the second Graph Convolutional Layer based on the relationship matrix to obtain the updated Node Feature.

5. The method of claim 4, wherein the association relationship between the any two first sub-features comprises:
a Euclidean distance between the any two first sub-features; or
a cosine similarity between the any two first sub-features.

6. The method of claim 1, wherein the determining the question feature based on the input question comprises:
encoding the input question successively by using a Word Embedding Algorithm and a feature embedding algorithm to obtain the question feature.

7. The method of claim 1, wherein the updated Visual Graph comprises the updated Node Feature, and the updated Node Feature comprise a plurality of second sub-features; and wherein the fusing the updated Visual Graph and the question feature comprises:
determining an attention weight between each of the plurality of second sub-features and the question feature based on an attention mechanism;
performing weighted sum on the plurality of second sub-features by using the attention weight between each of the second sub-features and the question feature to obtain an adaptive feature; and
fusing the adaptive feature and the question feature to obtain the fused feature.

8. The method of claim 7, wherein the fusing the adaptive feature and the question feature comprises:
performing an Element-wise dot product operation on the adaptive feature and the question feature to obtain the fused feature.

9. The method of claim 8, wherein the generating the predicted answer for the input image and the input question based on the fused feature comprises:
processing the fused feature by using a Multi-Layer Perceptron to obtain the predicted answer for the fused feature.

10. An apparatus for visual question answering, comprising:
an acquiring module, configured to acquire an input image and an input question;
a graph constructing module, configured to construct a Visual Graph based on the input image, wherein the Visual Graph comprises a Node Feature and an Edge Feature;
an updating module, configured to update the Node Feature by using the Node Feature and the Edge Feature to obtain an updated Visual Graph;
a question feature extracting module, configured to determine a question feature based on the input question;
a fusing module, configured to fuse the updated Visual Graph and the question feature to obtain a fused feature; and
a predicting module, configured to generate a predicted answer for the input image and the input question based on the fused feature,
wherein the updating module is further configured to perform at least one round of updating operation on the Node Feature of the Visual Graph by using a predetermined neural network, wherein the predetermined neural network comprises a Fully Connected Layer, a first Graph Convolutional Layer and a second Graph Convolutional Layer,
wherein each of the at least one round of updating operation comprises:
mapping the Node Feature of the Visual Graph to a first feature by using the Fully Connected Layer, wherein a number of spatial dimensions of the first feature equals to a predetermined number;
processing the first feature by using the first Graph Convolutional Layer to obtain a second feature;
processing the second feature by using the second Graph Convolutional Layer to obtain the updated Node Feature; and
constructing the updated Visual Graph by the updated Node Feature and the Edge Feature, and
wherein each of the at least one round of updating operation further comprises: constructing a Graph Laplacians based on the Edge Feature; and
wherein the processing the first feature by using the first Graph Convolutional Layer comprises: processing the first feature by using the first Graph Convolutional Layer based on the Graph Laplacians to obtain the second feature, wherein the second feature comprises a plurality of first sub-features.

11. A computer device, comprising:
a memory having computer instructions stored thereon; and
at least one processor;
wherein the processor, when executing the computer instructions, is configured to:
acquire an input image and an input question;
construct a Visual Graph based on the input image, wherein the Visual Graph comprises a Node Feature and an Edge Feature;
update the Node Feature by using the Node Feature and the Edge Feature to obtain an updated Visual Graph;
determine a question feature based on the input question;
fuse the updated Visual Graph and the question feature to obtain a fused feature; and
generate a predicted answer for the input image and the input question based on the fused feature,
wherein the processor is further configured to:
perform at least one round of updating operation on the Node Feature of the Visual Graph by using a predetermined neural network, wherein the predetermined neural network comprises a Fully Connected Layer, a first Graph Convolutional Layer and a second Graph Convolutional Layer,
wherein each of the at least one round of updating operation comprises:
mapping the Node Feature of the Visual Graph to a first feature by using the Fully Connected Layer, wherein a number of spatial dimensions of the first feature equals to a predetermined number;
processing the first feature by using the first Graph Convolutional Layer to obtain a second feature;
processing the second feature by using the second Graph Convolutional Layer to obtain the updated Node Feature; and
constructing the updated Visual Graph by the updated Node Feature and the Edge Feature, and
wherein each of the at least one round of updating operation further comprises: constructing a Graph Laplacians based on the Edge Feature; and
wherein the processing the first feature by using the first Graph Convolutional Layer comprises: processing the first feature by using the first Graph Convolutional Layer based on the Graph Laplacians to obtain the second feature, wherein the second feature comprises a plurality of first sub-features.

12. A non-transitory computer-readable storage medium having computer instructions stored thereon that, when executed by a processor, are configured to:
acquire an input image and an input question;
construct a Visual Graph based on the input image, wherein the Visual Graph comprises a Node Feature and an Edge Feature;
update the Node Feature by using the Node Feature and the Edge Feature to obtain an updated Visual Graph;
determine a question feature based on the input question;
fuse the updated Visual Graph and the question feature to obtain a fused feature; and generate a predicted answer for the input image and the input question based on the fused feature,
wherein the computer instructions are further configured to:
perform at least one round of updating operation on the Node Feature of the Visual Graph by using a predetermined neural network, wherein the predetermined neural network comprises a Fully Connected Layer, a first Graph Convolutional Layer and a second Graph Convolutional Layer,
wherein each of the at least one round of updating operation comprises:
  mapping the Node Feature of the Visual Graph to a first feature by using the Fully Connected Layer, wherein a number of spatial dimensions of the first feature equals to a predetermined number;
  processing the first feature by using the first Graph Convolutional Layer to obtain a second feature;
  processing the second feature by using the second Graph Convolutional Layer to obtain the updated Node Feature; and
  constructing the updated Visual Graph by the updated Node Feature and the Edge Feature, and
wherein each of the at least one round of updating operation further comprises: constructing a Graph Laplacians based on the Edge Feature; and
wherein the processing the first feature by using the first Graph Convolutional Layer comprises: processing the first feature by using the first Graph Convolutional Layer based on the Graph Laplacians to obtain the second feature, wherein the second feature comprises a plurality of first sub-features.

* * * * *